US012131202B2

(12) United States Patent
Young et al.

(10) Patent No.: US 12,131,202 B2
(45) Date of Patent: Oct. 29, 2024

(54) CLOUD COMPUTATION FOR APPLICATIONS ON MEDIA DEVICES

(71) Applicant: Roku, Inc., San Jose, CA (US)

(72) Inventors: Mark Young, Austin, TX (US); John Roberts, San Jose, CA (US); Chakri Kodali, Mountain View, CA (US); Cameron Esfahani, Austin, TX (US); David Lee Stern, Los Gatos, CA (US); Anthony John Wood, Palo Alto, CA (US); Benjamin Combee, Austin, TX (US); Ilya Asnis, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/825,164

(22) Filed: May 26, 2022

(65) Prior Publication Data

US 2022/0391268 A1    Dec. 8, 2022

Related U.S. Application Data

(60) Provisional application No. 63/194,749, filed on May 28, 2021.

(51) Int. Cl.
*G06F 9/54* (2006.01)
*H04N 21/81* (2011.01)

(52) U.S. Cl.
CPC .............. *G06F 9/541* (2013.01); *G06F 9/542* (2013.01); *G06F 9/547* (2013.01); *H04N 21/8173* (2013.01)

(58) Field of Classification Search
None
See application file for complete search history.

(56) References Cited

U.S. PATENT DOCUMENTS

| 10,691,418 B1* | 6/2020 | Ritter ........................ G06F 8/34 |
| 2006/0005114 A1* | 1/2006 | Williamson ............ G06T 11/20 345/419 |

(Continued)

FOREIGN PATENT DOCUMENTS

WO    WO 2020/104999 A1    5/2020

OTHER PUBLICATIONS

Grov, M., "Building User Interfaces Using Virtual DOM" University of Oslo; Retrieved from the Internet at URL: https://www.duo.uio.no/bitstream/handle/10852/45209/mymaster.pdf?sequence=7, May 20, 2015, 133 pages.

(Continued)

*Primary Examiner* — Charles E Anya
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for operating a user application including a user rendered context operating on a user device and maintaining a current render tree, and a user programmer context operating on a cloud computing system. The user rendered context of the user application can receive an input; and send, responsive to receiving the input, an event notification to the user programmer context of the user application. The user rendered context can further receive, from the user programmer context, a difference tree to update the current render tree, and update the current render tree based on the difference tree.

20 Claims, 9 Drawing Sheets

(56) References Cited

U.S. PATENT DOCUMENTS

| | | | |
|---|---|---|---|
| 2011/0289140 A1 | 11/2011 | Pletter et al. | |
| 2013/0263029 A1* | 10/2013 | Rossi | G06F 9/451 |
| | | | 715/764 |
| 2015/0135061 A1* | 5/2015 | Palanichamy | G06F 40/143 |
| | | | 715/235 |
| 2015/0193399 A1* | 7/2015 | Woker | H04L 41/02 |
| | | | 715/234 |
| 2016/0094483 A1* | 3/2016 | Johnston | G06F 8/65 |
| | | | 709/226 |
| 2016/0313983 A1* | 10/2016 | Davidchuk | G06F 8/38 |
| 2017/0031885 A1* | 2/2017 | S G | G06T 11/60 |
| 2017/0091160 A1* | 3/2017 | Lee | G06F 40/205 |
| 2018/0336721 A1* | 11/2018 | Ciechanowski | G06F 9/451 |
| 2020/0104970 A1* | 4/2020 | White | G06T 15/005 |

OTHER PUBLICATIONS

Extended European Search Report directed to related European Application No. 22175905.3, mailed Oct. 10, 2022; 12 pages.

\* cited by examiner

2

CLOUD COMPUTATION FOR APPLICATIONS ON MEDIA DEVICES

RELATED APPLICATION

This application claims priority to U.S. Provisional Application No. 63/194,749, filed on May 28, 2021, which is incorporated by reference herein its entirety.

BACKGROUND

Field

This disclosure is generally directed to applications on media devices, and more particularly to cloud computation for applications on media devices.

Background

Media systems can include media devices, such as a streaming media device, a DVD or BLU-RAY device, a television (TV), an audio/video playback device, a cable box, and/or a digital video recording device, to name just a few examples. Compared to a generic computing device, a media device may have more functions designed for playing media content such as video and audio content, but limited functions for other kinds of computing. Hence, applications operating on a media device may run into various limitations. Improved solutions for running applications on media devices are therefore needed.

SUMMARY

Provided herein are system, apparatus, article of manufacture, method and/or computer program product embodiments, and/or combinations and sub-combinations thereof, for developing and operating a user application or an application on a media device or a user device facilitated by a cloud computing system. A user application can include a user rendered context operating on a user device and maintaining a current render tree, and a user programmer context operating on a cloud computing system. The user renderer context can be executed on the user device and is responsible for providing input or output functions for the user application. The user programmer context is a part of the user application that is executed in the cloud computing system and is responsible for operations related to business logic, application flow, data model, or responses to user navigations. In some embodiments, the user application can be written in one language for both the user rendered context and the user programmer context.

The user rendered context of the user application can include an application user interface presented within a user renderer frame on a display of the user device. In some embodiments, the user renderer frame is contained within a root window of a graphical user interface (GUI) for a web browser installed on the user device. The user rendered context can generate drawing instructions to an abstracted two dimensional drawing surface without running HyperText Markup Language (HTML) in a browser. The user rendered context can include one or more small components, and a small component is responsible for low-level behavior including key responses, animations, or graphical appearance.

The user rendered context can start operation after the user programmer context is initialized on the cloud computing system. The user rendered context can receive an input; and send, responsive to receiving the input, an event notification to the user programmer context of the user application. The user rendered context can be initialized with an initial render tree provided from the user programmer context. The user rendered context can further receive, from the user programmer context, a difference tree to update the current render tree, and update the current render tree based on the difference tree. In some embodiments, the difference tree received from the user programmer context operated in the cloud computing system is represented by JavaScript Object Notation (JSON).

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
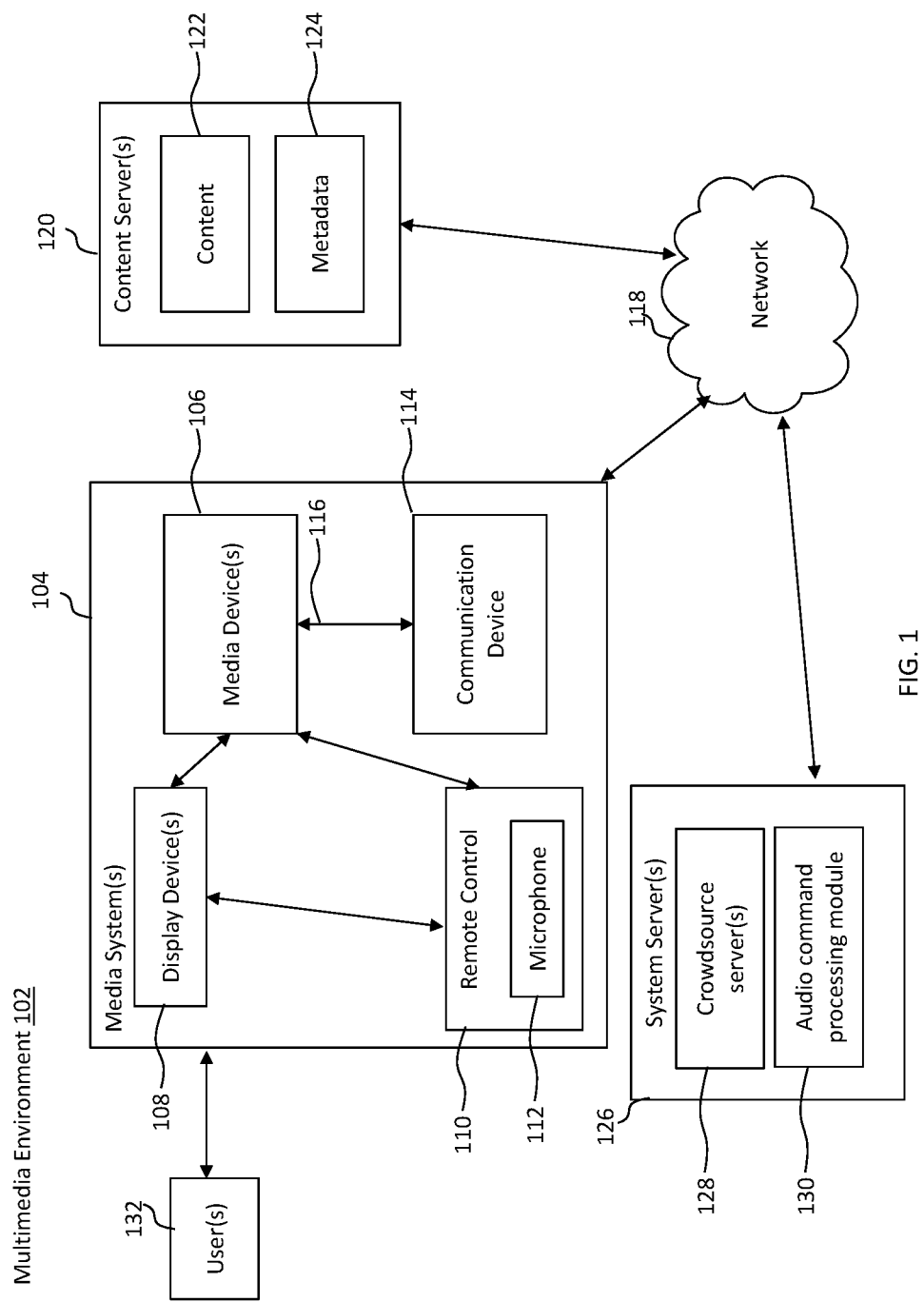
FIG. 1 illustrates a block diagram of a multimedia environment, according to some embodiments.

A media device, such as a streaming media device, a DVD or BLU-RAY device, an audio/video playback device, a cable box, a television (TV), and/or a digital video recording device, may have more functions designed for playing media content such as video and audio content, but limited functions for other kinds of computing. For example, the input device to a media device may be a remote control instead of a fully functional keyboard. And an application operating on a media device can have different limitations than applications operating on a generic computing device. An application can be referred to as a user application as well. For example, a media device may not support a normal web browser due to processing and storage demands. A media device may be referred to as a user device, and an application can be referred to as an app.

Embodiments herein present a cloud-based execution environment, providing a new way of execution for applications or channels. An application can be separated into two parts, a user renderer context operating on a media device, and a user program context operating on a cloud computing system. In some embodiments, the user program context can be referred to as a user programmer context as well. Functions in an application can be separated into two parts, where some functions are implemented in the user renderer context in small components, and where some other functions are implemented in the user program context in big components. The user renderer context can be executed on the media device and is responsible for the user input/output, such as graphical user interface (GUI), accepting inputs such as keystrokes, drawing to the screen, and receiving and reacting to user inputs. The user program context is the part of the application that can be executed in the cloud computing system and is responsible for the business logic, application flow, data model and responses to user navigation. The user renderer context can receive an update from the user program context to generate new user interface (UI) from a previous UI. The cloud computing system can maintain a container that stores multiple trees used to render UIs for multiple user renderer contexts on different user devices.

Embodiments herein also present a cloud-based development environment, providing an improved way of developing apps/channels. Currently, some development environments use proprietary languages/programs, and apps under the development have to run through the operating system in a media device (OS). Embodiments herein can be based on existing standards like Javascript rather than proprietary models, and can execute in the cloud rather than on the device, and can execute in a web browser for development, testing, and debugging purposes.

Embodiments herein can have numerous advantages, including but not limited to speeding up development, keeping devices affordable, increasing ease of use by developers familiar with standard languages, improving availability of debugging tests and other development tools that work on standards rather than proprietary languages/programs.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, ca able box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. Both media device 106 and display devices 108 can be referred to as a user device. In some embodiments, media device 106 can be a part of, integrated with, attached to, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106, display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106, display device 108 using cellular, Bluetooth, infrared, etc., or any combination thereof.

Multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media device 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie.

System servers 126 may also include an audio command processing module 130. As noted above, remote control 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

Figure 2:
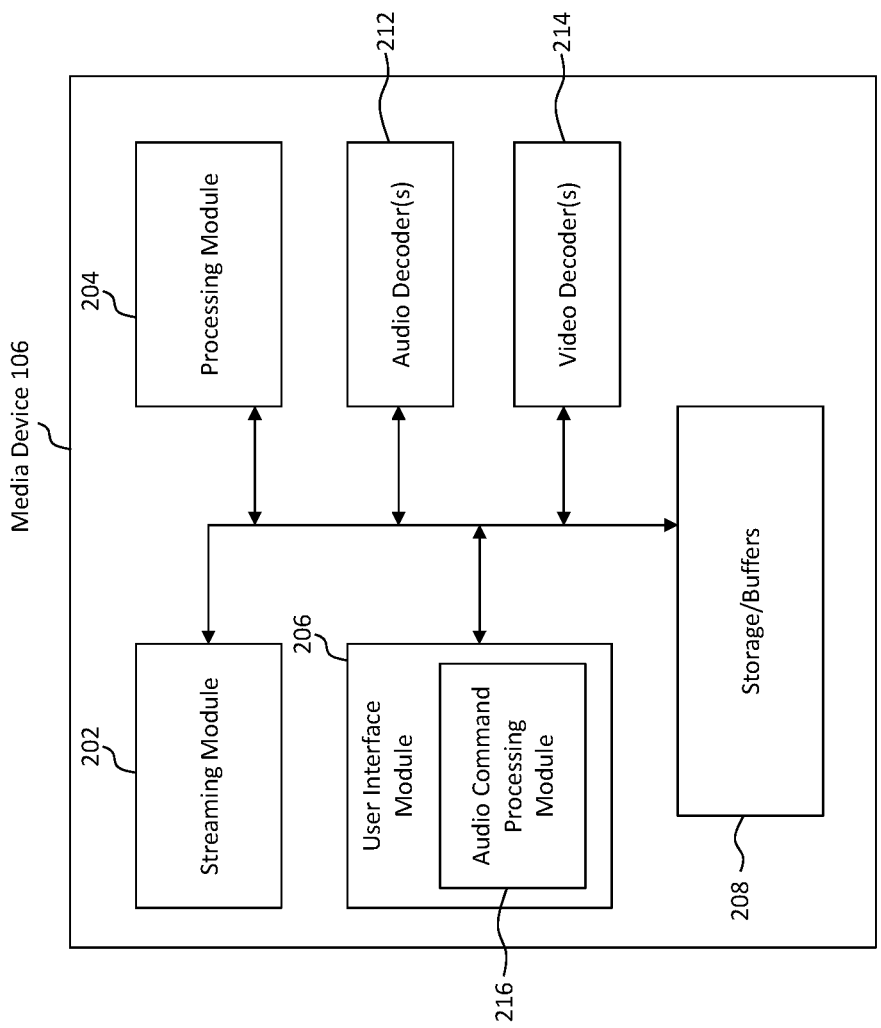
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

Clouding computing system to perform computations for a user device.

Figure 3:
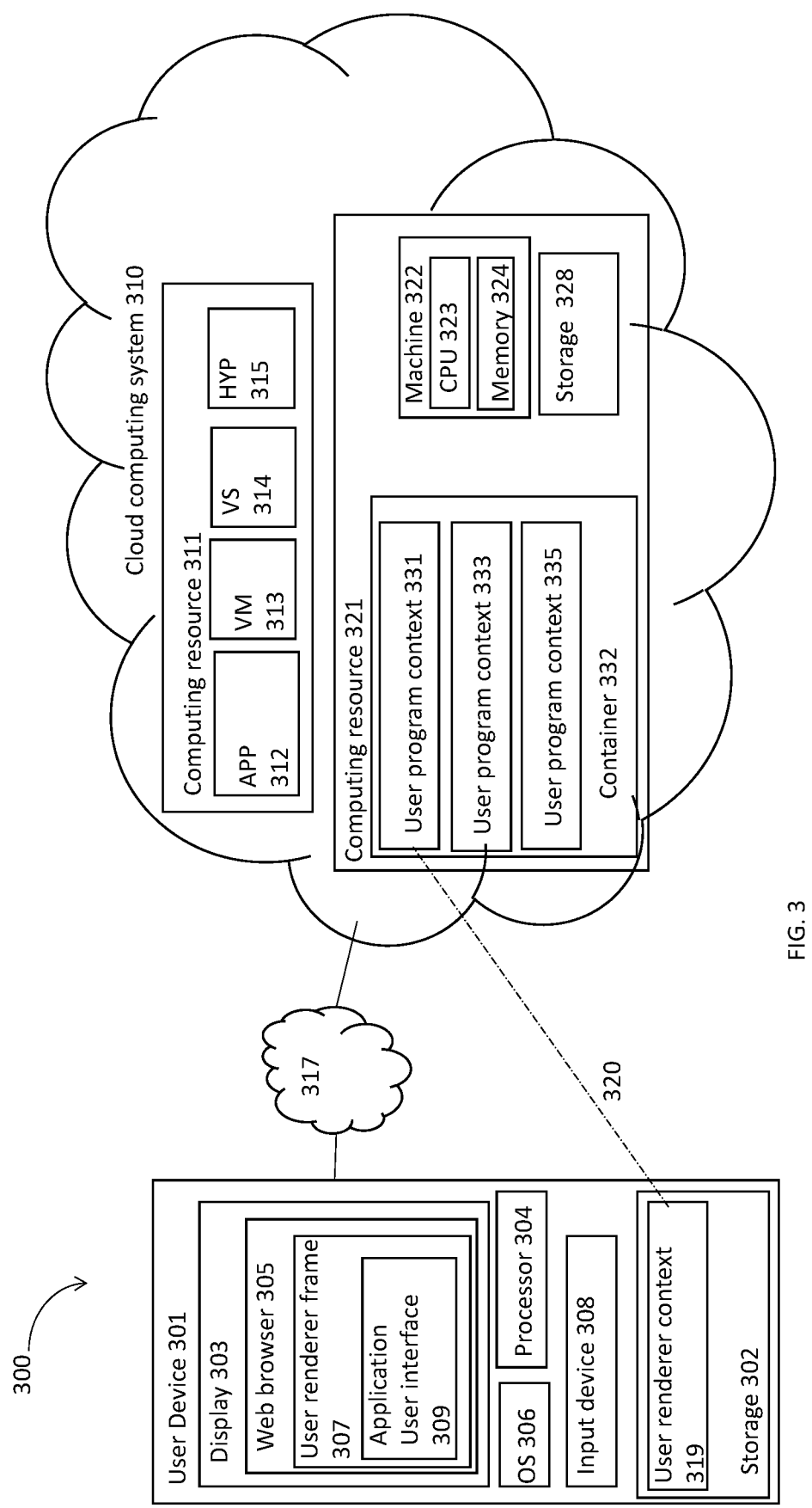
FIG. 3 illustrate an example clouding computing system to perform computations for a user device, according to some embodiments.

FIG. 3 illustrate an example clouding computing environment 300 to perform computations for a user device, according to some embodiments. Clouding computing environment 300 may include a user device 301, and a cloud computing system 310 communicatively coupled by a network 317. Clouding computing environment 300 may be an example of a portion of multimedia environment 102 shown in FIG. 1.

In some embodiments, user device 301 may be any device used by a user to perform various computing or communication tasks. For example, user device 301 may be a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, a server, an embedded device, or a similar type of device.

In some embodiments, one or more portions of network 317 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some embodiments, cloud computing system 310 includes an environment that delivers computing as a service, whereby shared resources, services, etc. Cloud computing system 310 may provide computation, software, data access, storage, and/or other services that do not require end-user knowledge of a physical location and configuration of a system and/or a device that delivers the services. Cloud computing system 310 may include computer resource 311 and computing resource 321, in addition to other clouding computing components.

Each computing resource, e.g., computer resource 311, computing resource 321, can include one or more personal computers, workstations, computers, server devices, or other types of computation and/or communication devices, and computing instances executing in computing resources. A computing resources, e.g., computer resource 311, computing resource 321, may communicate with other cloud computing resources via wired connections, wireless connections, or a combination of wired or wireless connections.

In some examples, computer resource 311 may include a group of cloud resources, such as one or more applications ("APPs") 312, one or more virtual machines ("VMs") 313, virtualized storage ("VS") 314, and one or more hypervisors ("HYPs") 315. APP 312 may include one or more software applications that may be provided to or accessed by other components or computing devices, e.g., user device 301.

Virtual machine 313 may include a software implementation of a machine (e.g., a computer) that executes programs like a physical machine. Virtual machine 313 may be either a system virtual machine or a process virtual machine, depending upon the use and degree of correspondence to any real machine by virtual machine 313. A system virtual machine may provide a complete system platform that supports execution of a complete operating system (OS). A process virtual machine may execute a single program and may support a single process. Virtual machine 313 may execute on behalf of a user (e.g., user device 301), and may manage infrastructure of the cloud computing system 310, such as data management, synchronization, or long duration data transfers.

Virtualized storage 314 may include one or more storage systems and/or one or more devices that use virtualization techniques within the storage systems or devices of computing resource 311. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically store. This may enable optimization of storage use, server consolidation, and/or performance of non-disruptive file migrations.

Hypervisor 315 may provide hardware virtualization techniques that allow multiple operations systems (e.g., "guest operating systems") to execute concurrently on a host computer, such as computing resource 311. Hypervisor 315 may present a virtual operating platform to the guest operating systems, and may manage the execution of the guest operating systems multiple instances of a variety of operating systems and may share virtualized hardware resource.

Computing resource 321 can be an example of computing resource 311, and can include various machines, e.g., machine 322, which can be a computing device or a virtual machine, e.g., VM 113, and can include a processor 323 and a memory 324. Computing resource 321 can include storage 328, and other components, not shown.

User device 301 may include a display 303, a storage 302, a processor 304, an operating system (OS) 306, and an input device 308. A web browser 305 may operate on user device 301. A user rendered context 319, which is a part of a user application 320, can be stored in storage 302. User rendered context 319 can provide input/output (I/O) functions for user application 320. An application user interface (UI) 309 for user rendered context 319 can be presented on display 303 within a user renderer frame 307. In some embodiments, when user device 301 does not have web browser 305 installed, user renderer frame 307 can be the top level window of the graphical user interface (GUI) for user application 320. In some other embodiments, when user device 301 has web browser 305 installed, user renderer frame 307 can be contained within the root window of the GUI for web browser 305.

User application 320 can include user rendered context 319 and user programmer context 331 that operates within cloud computing system 310 supported by computing resource 321. Computing resource 321 can support a container 332 that contains multiple user programmer contexts, such as user programmer context 331, user programmer context 333, user programmer context 335, and more. In some examples, there can be thousands or more different user programmer contexts included in container 332. Each user programmer context can be for a different application with a user rendered context operating on a different user device.

Figure 7:
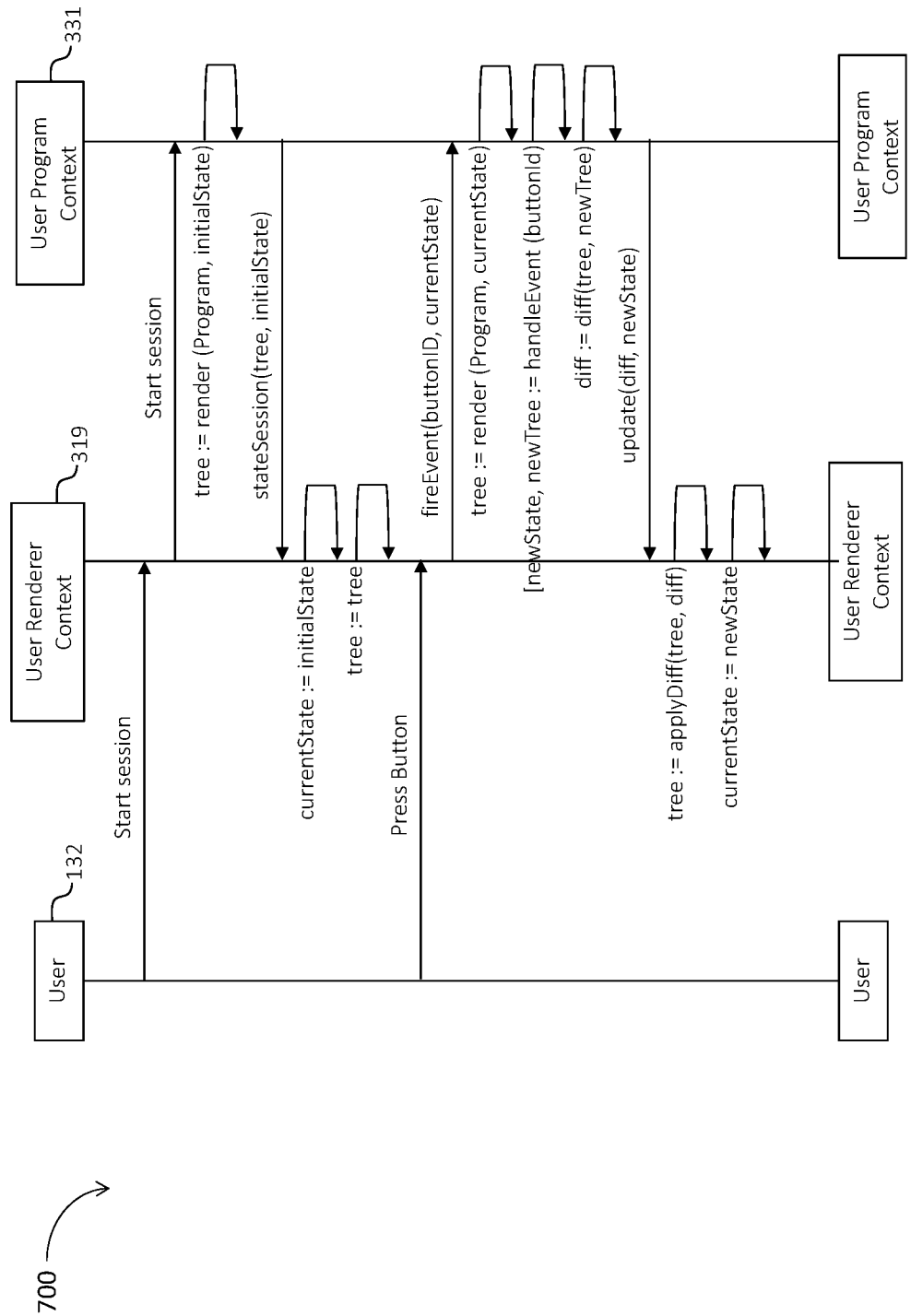
FIGS. 7-8 illustrate example sequence diagram of operations performed by an application operating on a user device and a cloud computing system, according to some embodiments.

User application 320 includes user rendered context 319 operating on user device 301 and user programmer context 331 operating in cloud computing system 310. However, user application 320 can be different from a web application where part of the code of a web application can run in a browser on a user device, with some backend code to perform some operations at a web server. A web application normally is a collection of different parts. The part operating at the web browser on a user device can be written in different languages such as HyperText Markup Language (HTML), Cascading Style Sheets (CSS), or Javascript. The part of a web application written by HTML can function without other parts. In comparison, user application 320 can be written in one language for both user rendered context 319 and user programmer context 331. In addition, as shown in FIG. 7, user rendered context 319 cannot start operation until user programmer context 331 is initialized. Therefore, user rendered context 319 and user programmer context 331 are integrated together, one cannot function without another, instead of a collection of different functional parts as in a web application. Furthermore, when a web application that undergoes page transitions, the web server sends down HTML to update or replace a current page or part thereof. In other words, the web server computes the results of what the updated web page should be, and the user device merely layout the received updated web page or a part of it from the web server. On the other hand, in some embodiments, the user programmer context 331 in the cloud computing system computes a difference tree to represent the differences between the updated tree and the current tree, while user rendered context 319 operating on user device 301 computes the final tree before performing the layout of the updated tree. Moreover, the difference tree sent from the cloud computing system to user device 301 can be represented by JSON instead of HTML.

Figure 4:
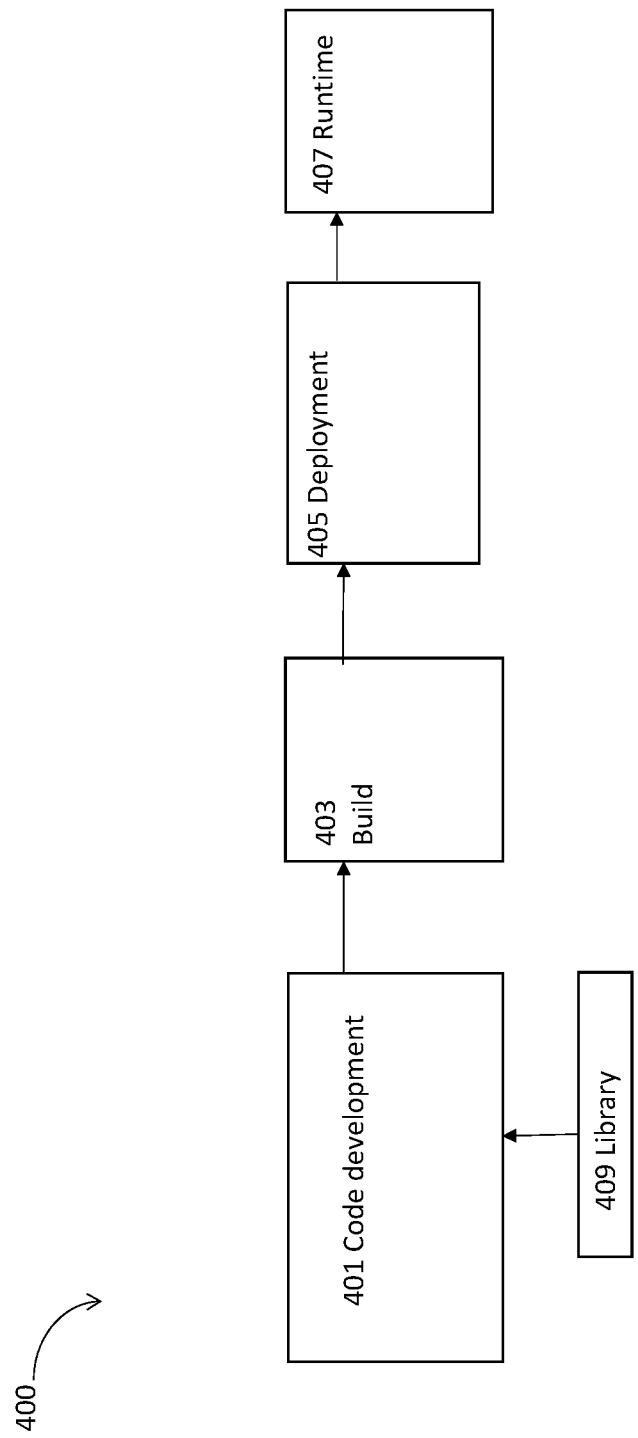
FIG. 4 illustrates an example software process for developing an application operating on a user device and a cloud computing system, according to some embodiments.

FIG. 4 illustrates an example software process 400 for developing an application operating on a user device and a cloud computing system, e.g., user application 320, according to some embodiments. In some examples, an application goes through multiple stages from the time a developer team starts to program user application 320 to the time a user can use user application 320.

At code stage 401, user application 320 is programmed. The code for user application 320 can also include code from existing libraries from the platform or from other third parties. The code for user application 320 and the library code can be bundled and compiled at build stage 403. After being built, at deployment 405, user application 320 is ready for deployment to a server in a cloud computing system and a client, which can be user device 301. For example, user application 320 can be deployed to a SaaS server. At runtime stage 407, user application 320 can be operated on user device 301 to load user rendered context 319 onto user device 301, and load user programmer context 331 on a server of cloud computing system 310.

In some embodiments, some system-supplied code exists in the form of Javascript (JS) libraries that are packaged and distributed via node package manager (npm). This system-supplied code can provide a high-level interface and abstraction to the underlying host architecture which includes Roku OS, or other browsers and possibly other TV OS at user device 301. The libraries also include a React-like library for writing components, business logic and control flow, and a client-side library for writing GUI components like lists, grids and dialogs. There is also a complete component library containing standard UI components like sliding panels, row list, or other GUI components known to one having ordinary skills in the art.

During development at code stage 401, the system-supplied code and user developed code can be bundled together and can be debugged in a browser. Furthermore, the developer is free to include code from other sources (other libraries, other components etc), eschew using the system libraries or parts thereof and even modify (fork) system-supplied code to customize it. In many respects, the user code may bring its own libraries and components, which may exceed the normal capability provided in a web browser development environment.

During build time at build stage 403, the various packages of code can be bundled and uploaded to a server in cloud computing system 310 where they are available for further testing on device, and ultimately used in production.

There is also a mechanism by which a system provider can deploy trusted code to implement important Platform APIs like RokuPay. Here, the code cannot be seen or inspected by the developer, and the developer has to trust that is has not been modified at build time or altered at runtime.

Figure 5:
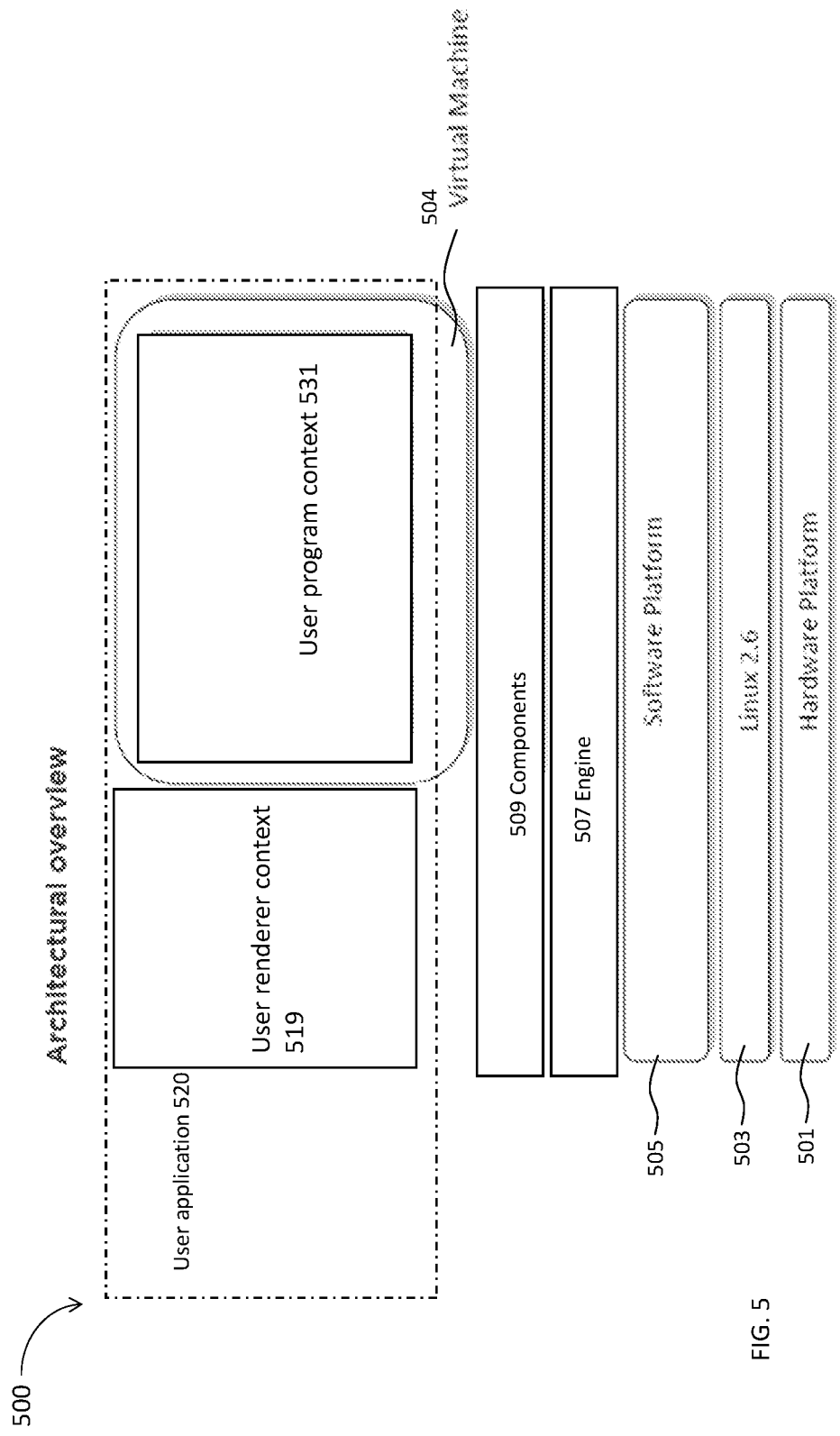
FIGS. 5-6 illustrate example architectural overviews of applications operating on a user device and a cloud computing system, according to some embodiments.
Figure 6:
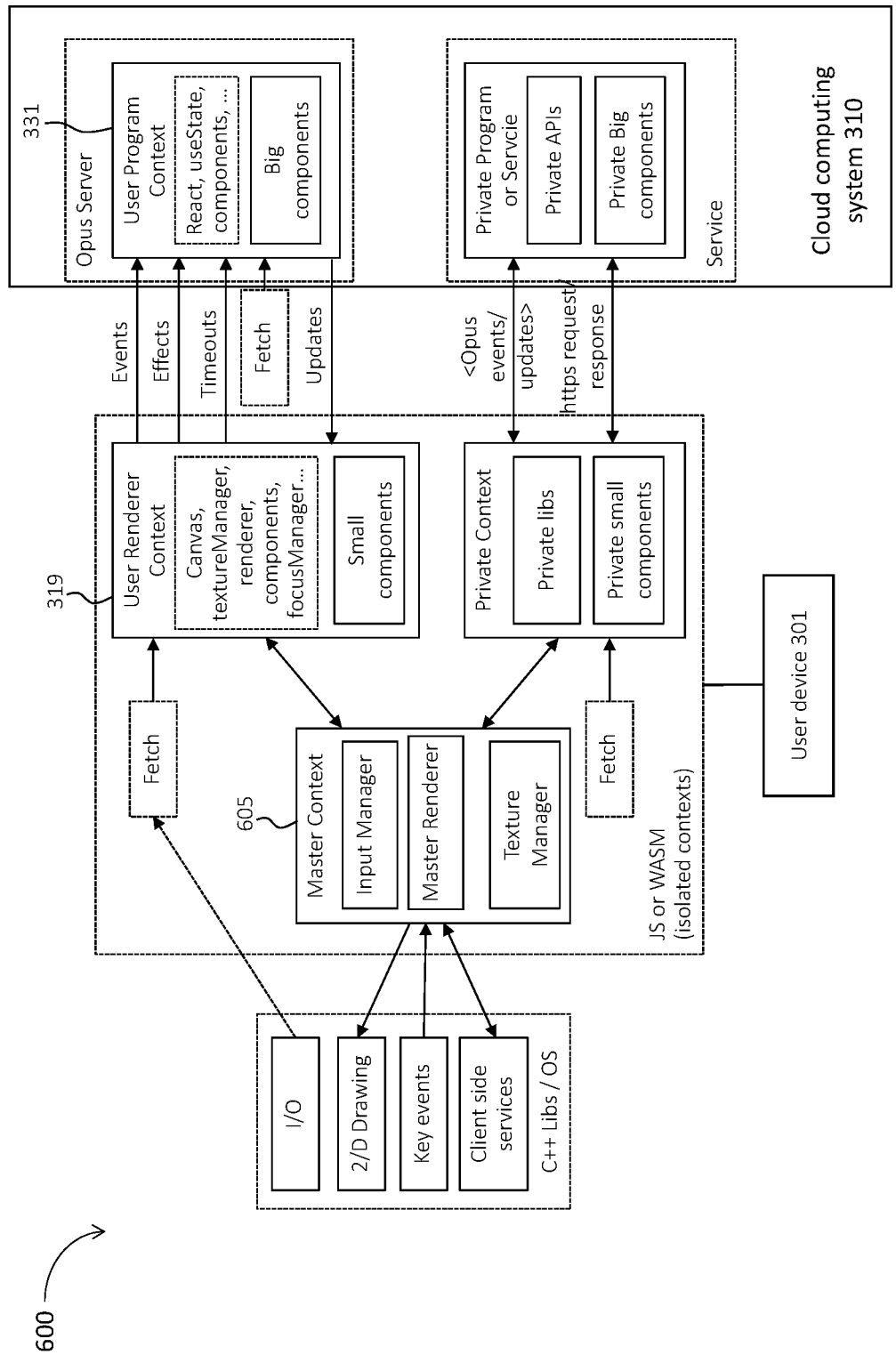

FIGS. 5-6 illustrate example architectural overviews of applications operating on a user device and a cloud computing system, according to some embodiments.

FIG. 5 shows an abstract view of system architecture 500 that includes a user application 520, which includes user rendered context 519 and user programmer context 531 operating on a user device and a cloud computing system. User programmer context 531 can be operated on a VM 504 within a cloud computing system. User rendered context 519 can be operated on a user device including hardware platform 501, an OS 503, a software platform 505 that can include an engine 507 and various other components 509.

FIG. 6 illustrates more details of a system architecture 600. System architecture 600 can be an example of system architecture 500, with more details on some of the components. In some examples, system architecture 600 can be referred to as Opus. Advantages of Opus may include: (1) Roku Apps can run in the cloud computing system 310, and UI is rendered on user device 301; (2) Opus system architecture can support much faster development cycles by allowing use of modern cloud technologies (e.g. node.js, javascript, etc.) to write Apps; (3) Opus system architecture can use standard programming languages, tools and libraries, such as Javascript or WebAssembly (WASM); (4) User applications can be developed and debugged in a browser; (5) User apps written for Opus can be deployed on non-Roku OS targets; (6) User apps can provide Channel Store support; (7) Opus system architecture can support all relevant Roku APIs such as Roku Pay, Roku Advertising Framework (RAF), authentication, or APIs from any other third parties, etc.

System architecture 600 includes user rendered context 319 operating on user device 301 and user programmer context 331 operating in cloud computing system 310. In addition, system architecture 600 can include other private environments, such as private program of service, private context, master context, and more.

User programmer context 331 is the part of application 320 that can be executed in cloud computing system 310 or directly on hardware if it is powerful enough. It is responsible for the business logic, application flow, data model and responses to user navigation.

User renderer context 319 executes on user device 301 and is responsible for drawing to the screen and receiving and reacting to user input such as keystrokes. In system architecture 600, application developers can write their own components, also in Javascript, and have them perform highly stylized animations or effects. A pre-built set of components, libraries and patterns can also be supplied for developers to use or extend.

System architecture 600 can also include one more private Contexts. There are several private contexts that also execute JS or WASM code. These are discussed in a section below.

User renderer context 319 can include many features. User renderer context 319 maintains a traditional render tree composed of a tree of nodes. In some embodiments, there are no complex class hierarchies among the nodes of the trees. Instead, each node is a pure JS object, the simplest of which is just { }. Each node may have a collection of properties, stored in property attributes ("props"). Each node may have a collection of child nodes stored as an array on the node, stored in children. Each node may have a tag stored in the property element. Text nodes are represented as a raw string inside a child array.

User renderer context 319 can generate drawing instructions to an abstracted 2D drawing surface using an API that adheres to a subset of the HTML 2D Canvas specification. This is the primary way in which user renderer context 319 works in a web browser and on Roku OS hardware. However, user renderer context 319 does not need to run HTML in a browser. Instead, user renderer context 319 works the same when user device 301 supports only Javascript and a suitable 2D drawing interface (plus a few other base requirements). User renderer context 319 also manages the keyboard focus, dispatches key events and manages update operations on the node tree. User renderer context 319 does not perform the computation to generate the render tree. The render tree is generated by user programmer context 331 instead. User programmer context 331 generates the render tree, or an update to the render tree, sends the update of the render tree to user rendered context 319, and user rendered context 319 performs the update to the render tree.

User renderer context 319 includes small components. A Small Component is responsible for low-level behavior such as key responses, animations and graphical appearance. A Small Component is to distinguish from high-order components that run in user programmer context 331. If a node of the render tree has an element property, this identifies a collection of JS functions that will run in the renderer context at various phases of the drawing, mounting or update algorithms. For example, a tag called "rectangle" can be defined for the render tree, this will reference a dictionary of JS functions known to the renderer, as shown below:

```
const rectangle = {
    draw: (...) => {...},
    handleKeyEvent: (...) => {...},
    onComponentDidMount: (...) => {...}
};
```

The base renderer does not contain any of its own small components, all of these may be provided by the application programmer although there will be one or more component libraries that define and implement a particular widget style and are available for use out-of-the-box.

Once a node has been inserted into the render tree (known as mounting) by user rendered context 319, the render tree may keep and reference internal state variables. These variables are used to track things such as currently selected item or animation transition effects. Internal state is local to user rendered context 319 only, and may not be transmitted to user programmer context 331. For example, consider a Modal Dialog component. This component may have a question, along with two possible actions from the user, OK or Cancel. While the model is displayed, internal state is used to track which response is currently selected while the Left and Right keys can be used to alternate between those responses. Only when the user selects an action, is the result transmitted user programmer context 331. Small Components can attach a state object to the node to keep track of these values.

The mounting pass—at the beginning of a session, user rendered context 319 is initialized with a render tree that has been provided from user programmer context 331. User rendered context 319 can visit each node in the render tree and call the lifecycle function onComponentDidMount for each component that has one. In some examples, onComponentDidMount is called when a node is first added to the tree. It is up to the small component for that node to do anything (it might do nothing). Typically, the component would establish default state variables. During this pass, the components have chance to initialize internal state. For example, if a component is managing a list of items that can be selected, it may initialize a state variable to indicate which item is currently selected. This state variable can be adjusted later by an event such as a keypress. Components that have animations would typically create state variables to manage the current state of animation. Components can also make pre-calculations at this point as well as examine the node's properties and any children it has.

The Drawing Pass

The positioning of each node of the render tree is relative to the parent, and the width and height are pre-calculated by the parent as well. To help with this, the base renderer drawing algorithm can adjust the canvas origin to (0, 0) for each child node. It also has built-in interpretations for the properties:—left, right, top, bottom, width, height and bounds. For example, if a node has property left={30}, the drawing algorithm adjusts the origin such that drawing at (0,0) will draw 30 pixels to the right of the parent's origin. The width of this child control would also be adjusted to be 30 px less than the parent.

In some embodiments, a node's placement rectangle can be contained within its parent. However, the child nodes may use negative numbers to adjust its rectangle to be expanded beyond that of its parent. Provided the parent has not clipped its children, that would allow children to draw outside of their parents' rectangle.

User rendered context 319 can have some simple drawing algorithm. Starting from the root of the tree, user rendered context 319 performs a breadth-first iteration of the tree, giving each node chance to issue draw instructions. By default, the algorithm will visit the entire tree, but this can be trimmed by components if they know that their children are off screen.

When visiting a node, the drawing algorithm adjusts the origin, calculates the width and height of the node, and then delegates drawing responsibility to the component's draw function (if it has one). In a drawing function, a component can perform the following operations: (1) issue drawing commands to the drawing context; (2) push and pop state to the drawing context using save( ) restore( ) and other mutating methods such as fillStyle; (3) clip the drawing rectangle to contain this node (and its children) within a specified rectangle. In some examples, fill Style is a property of the drawing service that is used in subsequent calls. For example, if fillStyle is "solid" then fillRectangle will draw a solid rectangle. The component can further manage drawing of the children by adjusting the origin before drawing each child, selectively drawing children that are visible and skipping those that are not, and delegating drawing commands to child nodes or drawing them directly. In addition, the component can further perform timing calculations related to the current frame time value (required to handle animation effects, and determine when they end).

User rendered context 319 can also keep track of a "next frame requested" time that can be set by any component. When a component is animating, it will request an immediate frame callback to make sure it can be animated smoothly. When no components request a callback, the render loop can idle until an external event starts the draw loop again. The entire tree is rendered on each frame—user rendered context 319 does not make an attempt to optimize this by only redrawing dirty areas of the screen.

Drawing command list—The drawing undertaken by user renderer context or private context can actually be made to a proxy Canvas object implementing the HTML 5 Canvas API. Underneath, that proxy writes the commands to a list. Once done, the list is sent to the Master Context where the actual drawing takes place. This is done to isolate drawing in one context from another. It also allows better control flow and timing measurements since the CPU required to draw the frame will not be interleaved with the CPU the renderer is using in its drawing logic (it gets queued and done at the end). Another benefit is to take advantage the extra processor cores available on some devices.

Updates—an update is a transaction that arrives from user programmer context 331 in response to an event, effect or timeout. The update record will contain a tree diff that contains instructions for amending the currently active render tree. The tree diff may be referred to as a difference tree. Updates can result in a few different situations, such as: (1) an existing node or subtree being removed from the graph (unmounted); (2) a new node or subtree being added as a child to an existing component (mounted), (3) a child taking a new position in parent's children list (moved), or (4) a node receiving updated props, either changes, additions, or props being deleted (updated)

An update operation can be sweeping and involve many nodes, or it could consist of just one node being updated. User programmer context 331 can produce a diff without the need for user rendered context 319 to send its existing tree, because user programmer context 331 can keep a copy of the existing tree on user rendered context 319. The diff is minimally represented on the wire, and can be safely applied as a transaction to the current tree. A diff represents changes that need to be made to the current existing tree of user rendered context 319.

The above described update operations are different from the traditional Document Object Model (DOM) architectures used in HTML and SceneGraph. In a traditional DOM architecture, user programmer context 331 can perform direct operations on the render tree, make changes to nodes as well as respond to events by further modifying the render tree. This can happen at any time and can introduce cryptic edge cases or make it difficult to achieve consistency. In embodiments, user programmer context 331 cannot make changes directly on the render tree managed by user rendered context 319. Instead, user programmer context 331 can only send any update operation in a transaction to user rendered context 319 so that user rendered context 319 can update the render tree based on the information from user programmer context 331. In Opus, the update operation can separate user rendered context 319 from user programmer context 331 in its entirety (there is no backdoor way to read from the renderer). In addition, user programmer context 331 is separated by a transactional request/response transport so that it can be run in the cloud.

In embodiments, user rendered context 319 is single threaded and each of its tree traversing algorithms is sequential, an update operation cannot be interrupted by an event or interrupt the drawing algorithm. It means that an update operation is guaranteed to be applied safely to the tree.

Client-side events—client-side events are those generated by the local system at user device 301, such as key presses. The client-side is the user device side, with respect to the server side which is the cloud computing system. These are sent into user rendered context 319 and may be routed into handlers within the node tree. For example, a key event may be routed to a component via its handleKeyEvent entry point. Each client-side event handler may only do the following things: (1) change internal state variables, (2) delegate the event to one or more children (provided they follow these same rules), (3) bubble an event to its parent, or (4) fire an external event.

Notably, event handlers should not change props, children or element properties of any node in the tree (which would change its structure and break everything).

External events—an external event is one that is generated by a component directed at user programmer context 331. For example, using the Model Dialog example, once the user has selected a response, the component may send an onChoiceSelected event. In some examples, onChoiceSelected is an example name for an external event. In this example, the event might cause the user program to dismiss the modal dialog with an affirmative or negative response from the user. Normally, user programmer context 331 would respond with an update transaction. To identify the component, there is a special property on each relevant node called id. The semantics, name and parameters of external events are up to the component designer and form part of its contract.

Effects and timeouts—there are two special cases that user rendered context 319 can callback to user programmer context 331. A special effect event is fired only after an update transaction has been applied to the tree. This guarantees that all nodes have been mounted and allows user programmer context 331 to run any side-effects associated with any of those nodes. Embodiments herein can achieve things like Ajax calls or any other asynchronous operations. An update transaction may include a single timeout value which is a timestamp that will occur in the future. Assuming that no other client-side events are fired, user rendered context 319 will fire an empty event when the timeout has expired. The timeout will normally execute some sort of update such as changing the currently selected item in a carousel.

User Programmer Context

One of the main goals of Opus is to execute user programmer context 331 in the cloud computing system 310 in a way that does not require a permanent instance of the program to be running on a server. This can be achieved by using functional programming techniques. Components and state can be expressed using pure functions and so forms the basis for a session-less solution.

Generating trees using React and JSX—in Opus, the user programmer context 331 can generate and update the render tree. It may generate an initial tree; and (2) process an event and generate an updated tree.

If user programmer context 331 is deterministic (always generates the same tree with the same inputs and same event sequence), user programmer context 331 can create an efficient diffing algorithm. The diffing algorithm can be run against the original tree and an updated tree to generate a diff which can then be sent to user rendered context 319 in an update operation. This means the programmer does not need to write any mutating logic at all for user rendered context 319, transactions are created by user programmer context 331 and transferred over the wire or connection to user rendered context 319.

In addition, in some embodiments, since generating trees can be repeated by executing the program with the same parameters, user programmer context 331 may not save the trees. Instead, user programmer context 331 can re-generate a tree when needed by supplying the same parameters (state).

The following is a simple program:—

```
const tree=render(<div>Hello World</div>);
```

(JSX is pure JS syntax, with an extension that understands HTML-like tags which are turned into createElement function calls.

The generated tree will be in the form of JSON that can be transmitted to the renderer. In this example, that tree would be:—

```
{
    children: ["Hello World"],
    element: "div"
);
```

User programmer context 331 can include Big Components. A component can be similar to the component concept defined in React Javascript library ("React"). The following is such an example of a component.

```
const Greeting = ({name}) => <div>Hello {name}</div>;
const tree = render(<Greeting name="Janet"/>);
//produces
{
```

```
        children: ["Hello Janet"],
        element: "div"
    }
```

The component Greeting shown above is called a Big Component because it may start with a capital letter. Notice that tag names that start with small letters become part of the final render tree and are not given any special meaning by user programmer context 331. Such final render tree can be referred to as a Small Component which are ones provided for user rendered context 319. For example:—

```
        const Greeting = ({name}) => <div
        color="blue"><greeting
        name={name}/></div>; const tree =
        render(<Greeting name="Janet"/>);
        //produces
        {
            props: {
                color: "blue"
            },
            children: [{
                props: {
                    name: "Janet"
                },
                element: "greeting"
            }],
            element: "div"
        }
```

Notice that a Big Component definition is actually a function. With respect to React, the rendering algorithm traverses the element tree executing (or reconciling) the big components, and results in a tree that only references small components.

Functional State Management

Traditional applications collect state as the program runs and that state cannot be detached from the program. In embodiments, a state hook is used which allows state to be written functionally to achieve a session-less server architecture using the principle that the same function executed with the same input produces the same output. The state hook looks like this:—

```
        const React, { useState } from "<path to react library>";
        const Counter = ( ) => {
            const [count, setCount] = useState(0);
            const increaseCount = ( ) => setCount(count + 1);
            return <div>
                <div>Current count: {count}</div>
                <button onSelect={increaseCount}>Increase</button>
            </div>;
```

The state hook requires user programmer context 331 to explicitly declare state variables using useState( ) function, and the only way to 'modify' values is through the setCount function returned by the hook.

Figure 8:
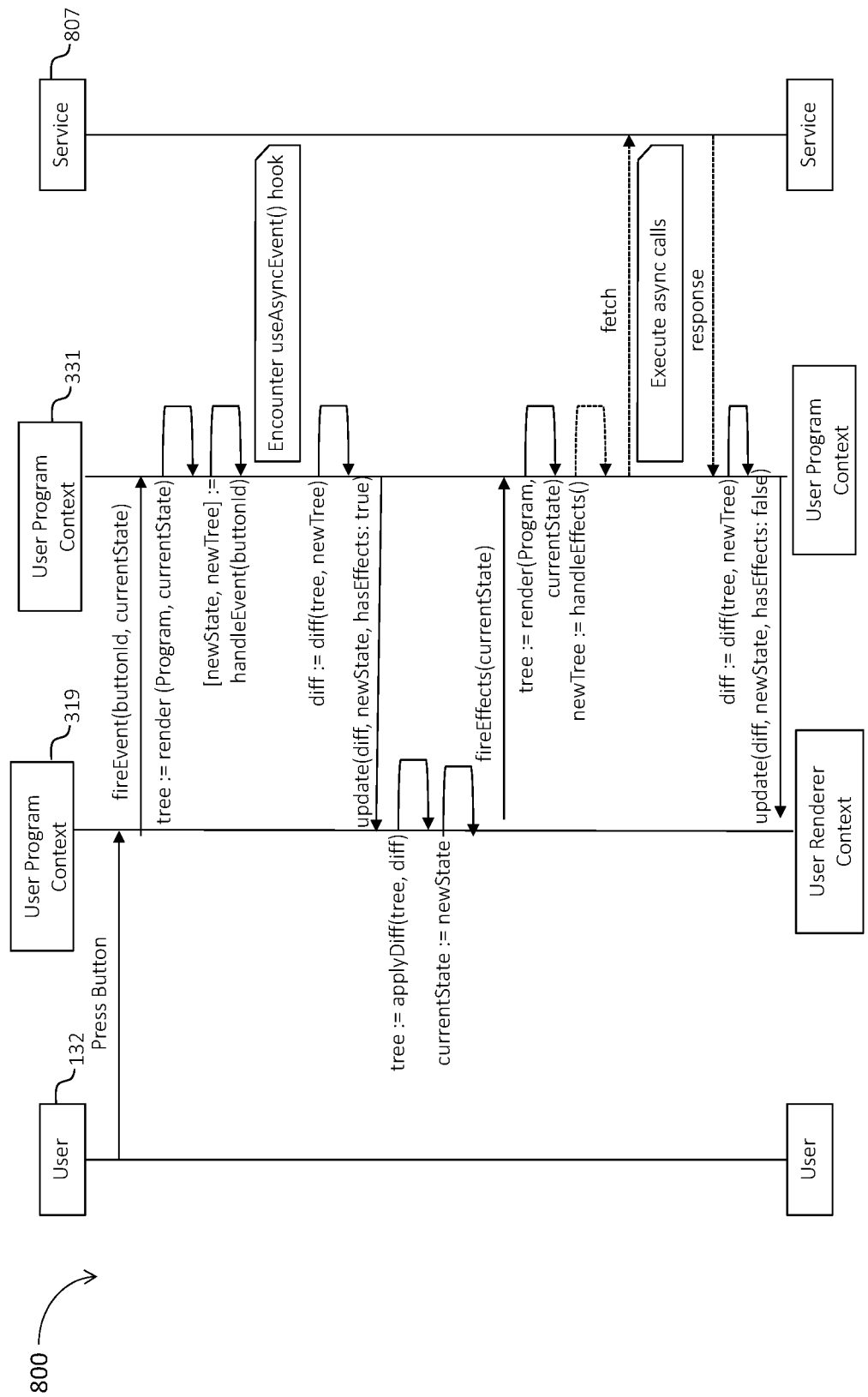

FIGS. 7-8 illustrate example sequence diagram of operations performed by an application operating on a user device, according to some embodiments. The following descriptions explain operations in FIGS. 7-8.

Events—the above example also shows how an event can be associated with a small component. Here, onSelect is an external event supported by a button small component. When the user selects the button, user rendered context 319 generates an external event which in turns makes a request to user programmer context 331. The framework can make the event be routed to the event handler. Once the event is executed, the reconciler of the framework can render the entire program again using the new state values. Finally, the reconciler can diff the original tree (before the event was executed) with the new one and generate an update record to send to the renderer. In some examples, the steps can include: (i) framework creates a copy of the render tree using the current state (this results in a copy of the tree identical to the one on the client); (ii) the framework executes the event handler which changes the state; (iii) the framework generates another copy of the render tree using the new state; and (iv) frameworks determines the difference between those two trees and sends back the difference to the user renderer context. Embodiments herein can be different from a normal React implementation. For example, in a normal React implementations, step (i) may not be needed because the program context is always kept in memory and has an affinity with the user renderer context. In some embodiments herein, the user program context can recreate the tree from the state when needed instead of saving the complete tree all the time.

The renderer and program need to know what the state values are at all times. To facilitate this, the Program may attach a state reference to the update transaction. This is similar to a cookie or a session identifier, except it may represent the immutable serialized state of the Program. When the renderer applies the transaction, it stores the state reference. Future events supply the state reference as a parameter in the event payload.

Asynchronous Effects—asynchronous effects can be demonstrated in FIG. 8.

In some embodiments, the event handlers can be synchronous once the fireEvent call reaches the server. This means that the event handlers cannot be asynchronous functions or generate side effects that call the setState modification functions in a callback. If this were the case, the fireEvent call could not be completed until all the asynchronous calls are resolved and this would leave us unable to respond to events in a timely manner.

React achieves asynchronous behavior through the useEffect hook. For example, the following code segment can demonstrate the asynchronous behavior. The code works in standard React because user programmer context 331 stays running and connected to the state setting function (i.e. setCards( )) returned by the useState hook. React can then resolve the call and trigger an update transaction on the actual tree. In some examples, user programmer context 331 may not stay running and cannot receive results from service calls or timing events.

In some embodiments, the service here as shown in FIG. 8 may just be an example of an external service call. In Javascript, external service call can be done asynchronously—the thread cannot block waiting for the result of the external service call. The service in this example is an arbitrary web service external to the system.

```
import <path to react library>, { useEffect, useState } from "<path to react library>";
const fetchJson = async url => {
    const response = await fetch(url);
    return response.json( );
};
export const Ajax = ( ) => {
    const [cards, setCards] = useState([ ]);
    useEffect(( ) => {
        (async ( ) => {
            const { deck_id: deckId } = await fetchJson("https://<my-cards-
```

```
    api>/api/deck/new
/shuffle/?deck_count=1");
    const { cards } = await fetchJson('https://<my-cards-
    api>/api/deck/${deckId}/draw/?
count=2');
setCards(cards) ;
}) ( );
    //can return a 'remove sideffect' function, which in this case would
    cancel the async operation if it is still pending
}, [ ]);
const [card, card2] = cards; return (
<panel key="ajax">
    {!card && "Dealing two cards..."}
    {card && "You got..."}
    {card && <poster top={40} left={90} uri={card.image} />}
    {card2 && <poster top={70} left={120} uri={card2.image} />}
    </panel>
    );
}
```

However, in Opus, the state is disconnected from user programmer context 331 and so the setCards( ) call cannot be valid in this context. To remedy this, embodiments herein introduce a hook with similar semantics to useEffect, useAsyncEffect( ) which declares an asynchronous function to be executed once the component has been mounted by user rendered context 319. The following usage would replace useEffect in the above example:—

```
    useAsyncEffeet(async ( ) => {
        const { deck_id: deckId } = await fetchJson("https://<my-cards-
api>/api/deck/new/shuffle/? deck_count=1");
        const { cards } = await fetchJson('https://<my-cards-
api/api/deck/${deckId}/draw/?count=2'); setCards(cards);
        //NOTE: cannot support remove side effect semantics
    }, [ ]);
```

To implement this, the response payload contains a flag hasEffects which is set to true if there is at least one unresolved use AsynEffect pending in the current response. On the renderer side, if any response has hasEffects set to true, the renderer will immediately issue a fireEffects call to the server (this is similar to sending an empty fire event call). The fireEffects call can be long running and the server is free to execute all asynchronous callbacks due and only return the result to the renderer when they have all been resolved.

One caveat is that if the renderer generates a new external event while fireEffects is pending, the fireEffects call may be abandoned to let the fireEvent call go through, and then if it is still relevant, it would be tried again after the event was resolved.

Private Contexts—to facilitate Platform APIs such as Roku Pay and RAF, Opus includes the concept of Private Contexts. This is primarily a client side JS isolate, or sandbox, into which Roku can load libraries that need to be kept private so they can be trusted. The initialization of these libraries is a platform feature in itself. At the low level, it includes a way to insert a private component into a render tree (if the library supports a GUI like the Roku Pay purchasing flow) or a way to call a private function directly if it does not require a GUI.

In some embodiments, a Private Platform API can be shipped with a public library that defines its interface. By way of example, this is how a Roku Pay order dialog might be launched by a user application:—

```
import React, { useState } from "<path to react library>";
import { ChannelStore, Order } from "@roku/roku-pay";
import { Modal } from "@roku/components";
const BuyProduct = ({ productCode, onSuccess, onFailure }) => {
    const [state, setState] = useState("ordering");
    const handleOrderStatus = result => { if(result.success) {
        setState("ok");
} else {
setState("canceled");
}
}
if(state === "ordering") {
return <ChannelStore command="doOrder" onOrderStatus={handleOrderStatus}>
<Order code={productCode}
qty={1}> Fluffy Slippers
</Order>
</ChannelStore>
}
if(state === "ok") {
return <Modal
onClose={onSuccess}> Thank
you. Enjoy your slippers...
</Modal>
}
if(state === "canceled") {
return <Modal
onClose={onFailure}> Got
cold feet? ...
</Modal>
}
```

The implementation of Channel Store might look like this:—

```
export const ChannelStore = ({ children, ...props}) => <isolate guid="<CHANNEL-STORE-
```

```
GUID>" ...props>{children}<
/isolate>;
export const Order = ({ children, code, qty }) => <order code={code}
qty={qty}>{children}</order>;
``` isolate is a special small component that the user renderer interprets as a placeholder for a private component. When asked to mount such a component, the user context passes the parameters up to the Master Context which is able to resolve the Globally Unique Identifier GUID (or URI) to identify the ChannelStore library.

The Master Context then loads ChannelStore into a private isolate and initializes it with the render sub-tree. From that point on, the Master Context will marshal events between the two contexts and be responsible for directing the key events to the active context, as well as merging the drawing instructions from both contexts to produce one frame.

Example Computer System

Figure 9:
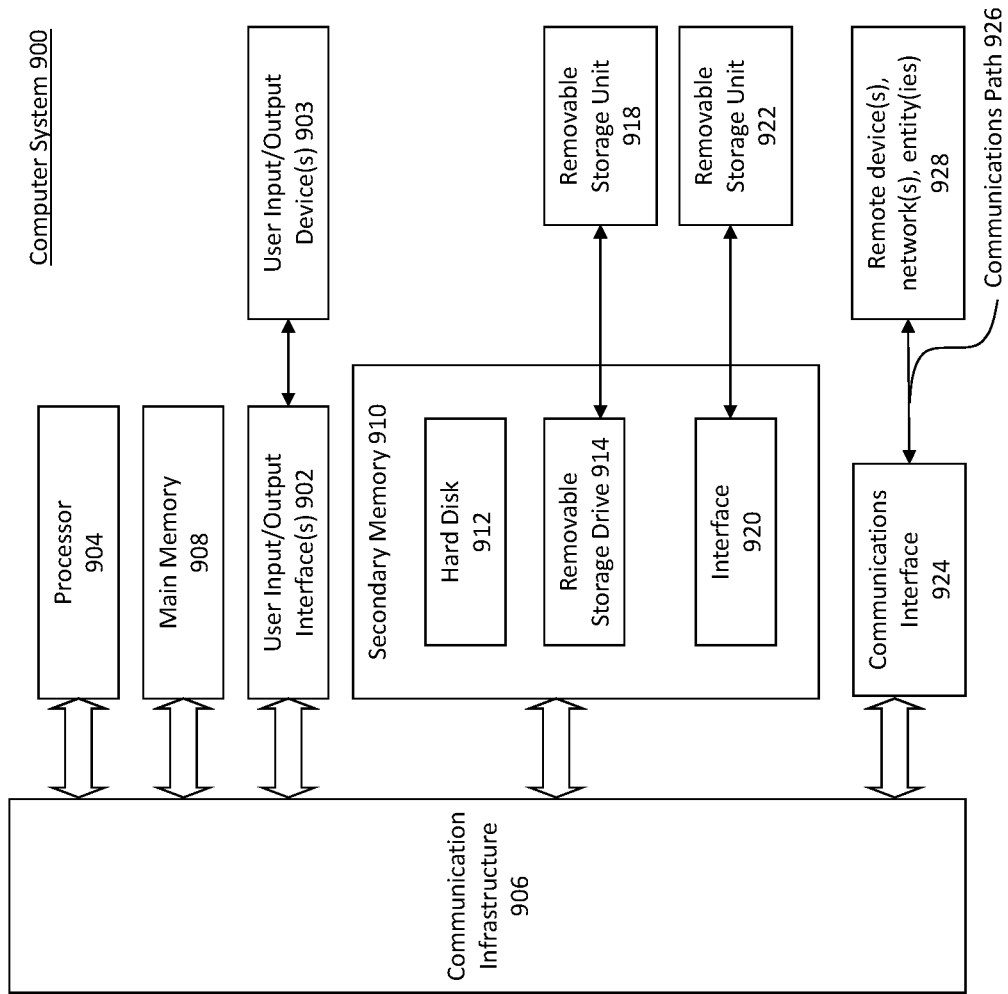
FIG. 9 illustrates an example computer system useful for implementing various embodiments.

Various embodiments may be implemented, for example, using one or more well-known computer systems, such as computer system 900 shown in FIG. 9. For example, media device 106, media device 108, media device 301, may be implemented using combinations or sub-combinations of computer system 900 to perform various functions described herein, e.g., by the sequence diagram 700 or sequence diagram 800. Also or alternatively, one or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900 or processor(s) 904), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for operating a user application, comprising:
receiving, by a user rendered context of the user application, an input, wherein the user rendered context operates on a user device and maintains a current render tree, the user rendered context includes an application user interface presented within a user renderer frame on a display of the user device, and generates drawing instructions to an abstracted two dimensional drawing surface without running HyperText Markup Language (HTML) in a browser;
responsive to receiving the input, sending an event notification to a user programmer context of the user application, wherein the user programmer context operates on a cloud computing system, the user application is different from a web application and includes the user rendered context and the user programmer context, and the user rendered context starts operation on the user device after the user programmer context is initialized on the cloud computing system;
receiving, from the user programmer context, a difference tree to update the current render tree; and
updating, by the user rendered context, the current render tree based on the difference tree.

2. The method of claim 1, wherein the user programmer context is a part of the user application that is executed in the cloud computing system and is responsible for operations related to business logic, application flow, data model, or responses to user navigations.

3. The method of claim 1, wherein the user rendered context is executed on the user device and is responsible for providing input or output functions for the user application.

4. The method of claim 1, wherein the user rendered context includes an application user interface presented within a user rendered frame on the display of the user device.

5. The method of claim 4, wherein the user renderer frame is contained within a root window of a graphical user interface (GUI) for a web browser installed on the user device.

6. The method of claim 1, wherein the user application is written in one language for both the user rendered context and the user programmer context.

7. The method of claim 1, wherein the difference tree received from the user programmer context operated in the cloud computing system is represented by JavaScript Object Notation (JSON).

8. The method of claim 1, wherein the user rendered context includes one or more small components, and a small component is responsible for low-level behavior including key responses, animations, or graphical appearance.

9. The method of claim 1, wherein the user rendered context is initialized with an initial render tree provided from the user programmer context.

10. A user device, comprising:
   at least one processor; and
   a user rendered context of a user application operated by the at least one processor, wherein the user rendered context operates on the user device and maintains a current render tree, the user rendered context includes an application user interface presented within a user renderer frame on a display of the user device, and generates drawing instructions to an abstracted two dimensional drawing surface without running HyperText Markup Language (HTML) in a browser, and the user rendered context is configured to:
   receive an input;
   responsive to receiving the input, send an event notification to a user programmer context of the user application, wherein the user programmer context operates on a cloud computing system, the user application is different from a web application and includes the user rendered context and the user programmer context, and the user rendered context starts operation on the user device after the user programmer context is initialized on the cloud computing system;
   receive, from the user programmer context, a difference tree to update the current render tree maintained by the user rendered context; and
   update the current render tree based on the difference tree.

11. The user device of claim 10, wherein the user renderer context is executed on the user device and is responsible for providing input or output functions for the user application, and the user programmer context is a part of the user application that is executed in the cloud computing system and is responsible for operations related to business logic, application flow, data model, or responses to user navigations.

12. The user device of claim 10, wherein the user renderer context includes an application user interface presented within a user rendered frame on the display of the user device.

13. The user device of claim 12, wherein the user renderer frame is contained within a root window of a graphical user interface (GUI) for a web browser installed on the user device.

14. The user device of claim 10, wherein the user rendered context is written in a same language as the user programmer context.

15. The user device of claim 10, wherein the difference tree received from the user programmer context operated in the cloud computing system is represented by JavaScript Object Notation (JSON).

16. The user device of claim 10, wherein the user rendered context includes one or more small components, and a small component is responsible for low-level behavior including key responses, animations, or graphical appearance.

17. The user device of claim 10, wherein the user rendered context is initialized with an initial render tree provided from the user programmer context.

18. A non-transitory computer-readable medium having instructions stored thereon that, when executed by at least a computing device, cause the computing device to perform operations comprising:
   receiving, by a user rendered context of a user application, an input, wherein the user rendered context operates on the computing device and maintains a current render tree, the user rendered context includes an application user interface presented within a user renderer frame on a display of a user device, and generates drawing instructions to an abstracted two dimensional drawing surface without running HyperText Markup Language (HTML) in a browser;
   responsive to receiving the input, sending an event notification to a user programmer context of the user application, wherein the user programmer context operates on a cloud computing system, the user application is different from a web application and includes the user rendered context and the user programmer context, and the user rendered context starts operation on the user device after the user programmer context is initialized on the cloud computing system;
   receiving, from the user programmer context, a difference tree to update the current render tree; and
   updating, by the user rendered context, the current render tree based on the difference tree.

19. The non-transitory computer-readable medium of claim 18, wherein the user rendered context is executed on the computing device and is responsible for providing input or output functions for the user application, and the user programmer context is a part of the user application that is executed in the cloud computing system and is responsible for operations related to business logic, application flow, data model, or responses to user navigations.

20. The non-transitory computer-readable medium of claim 18, wherein the user rendered context is initialized with an initial render tree provided from the user programmer context.

* * * * *